J. J. SAY.
HOISTING MACHINE.
APPLICATION FILED JAN. 15, 1908.

900,212.

Patented Oct. 6, 1908.

3 SHEETS—SHEET 1.

Witnesses

Inventor
Joshua J. Say
By Woodward & Chandler
Attorneys

J. J. SAY.
HOISTING MACHINE.
APPLICATION FILED JAN. 15, 1908.
900,212.
Patented Oct. 6, 1908.
3 SHEETS—SHEET 2.
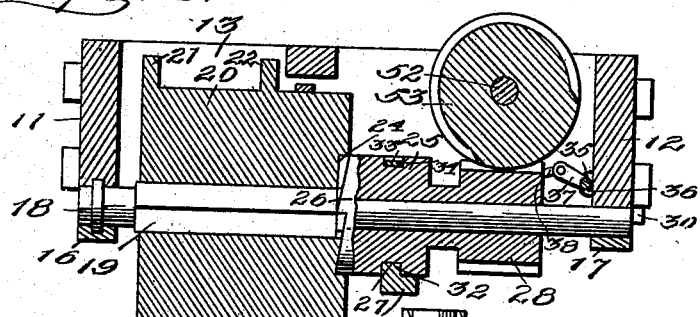
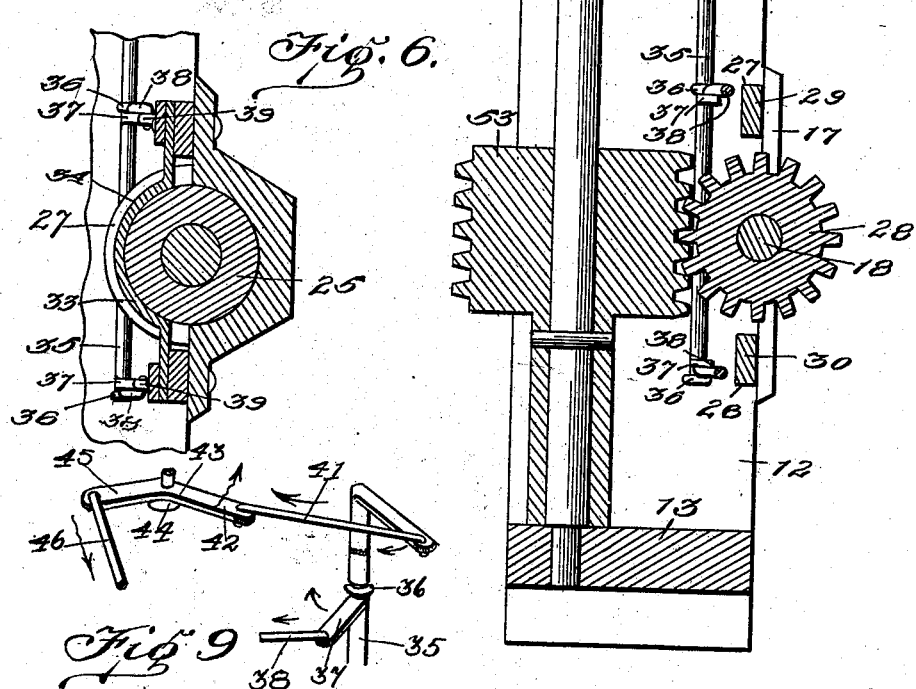
Witnesses
Geo L Thom
E. L. Chandler
Inventor
Joshua J. Say
By Woodward + Chandler
Attorneys J. J. SAY.
HOISTING MACHINE.
APPLICATION FILED JAN. 15, 1908.
900,212.
Patented Oct. 6, 1908.
3 SHEETS—SHEET 3.
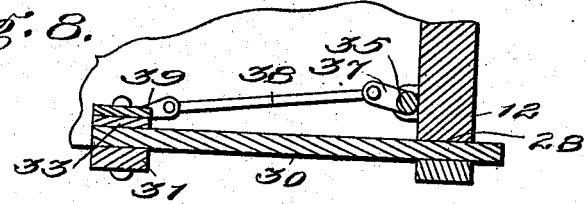
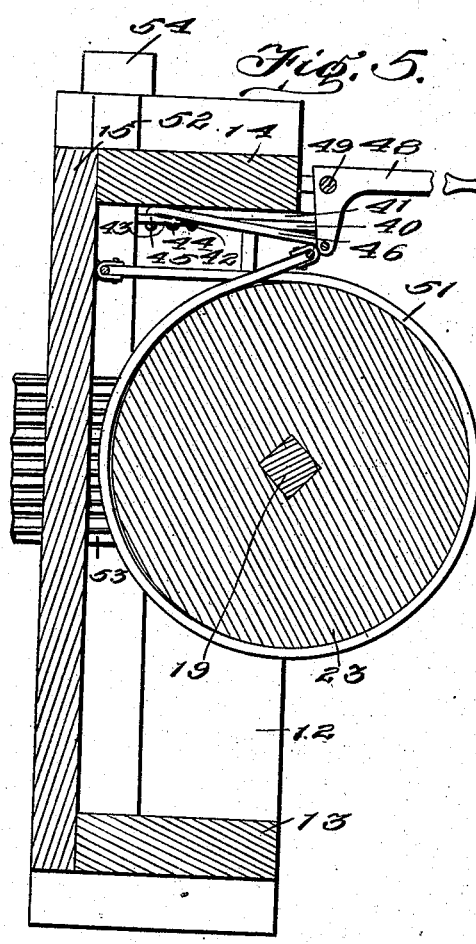
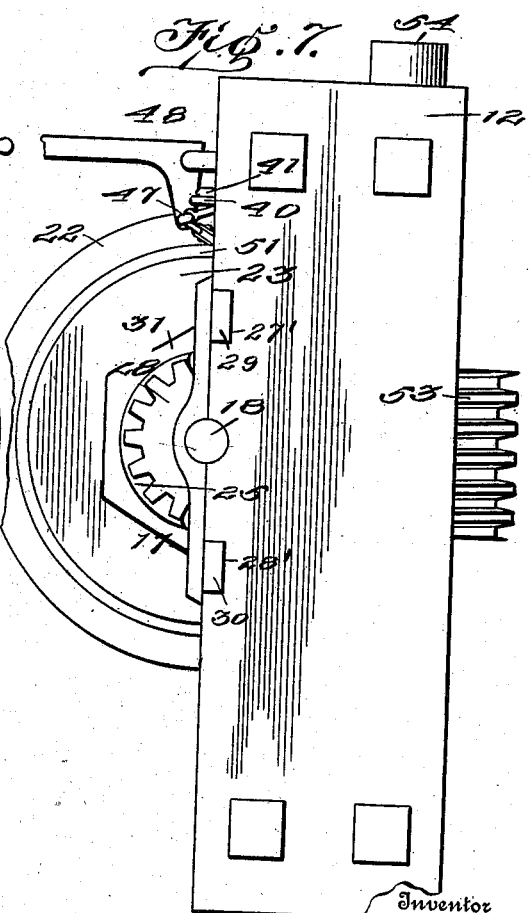

UNITED STATES PATENT OFFICE.

JOSHUA J. SAY, OF UNIONVILLE, MISSOURI.

HOISTING-MACHINE.

No. 900,212.  Specification of Letters Patent.  Patented Oct. 6, 1908.

Application filed January 15, 1908. Serial No. 411,010.

*To all whom it may concern:*

Be it known that I, JOSHUA J. SAY, a citizen of the United States, residing at Unionville, in the county of Putnam and State of Missouri, have invented certain new and useful Improvements in Hoisting-Machines, of which the following is a specification.

This invention relates to hoisting machines, and is more particularly adapted to use in connection with hay stackers or similar farm machinery, and has for its object to provide a machine of this character including a revolving drum, and means controllable from one point for operating its brake mechanism and its clutch mechanism.

Other objects and advantages will be apparent from the following description and it will be understood that changes in the specific structure shown and described may be made within the scope of the claim without departing from the spirit of the invention.

Figure 1:
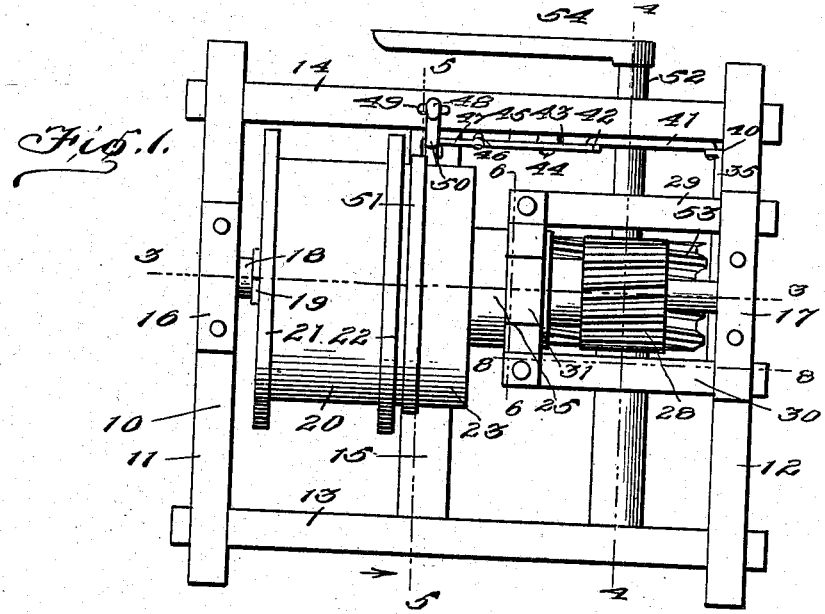
Figure 2:
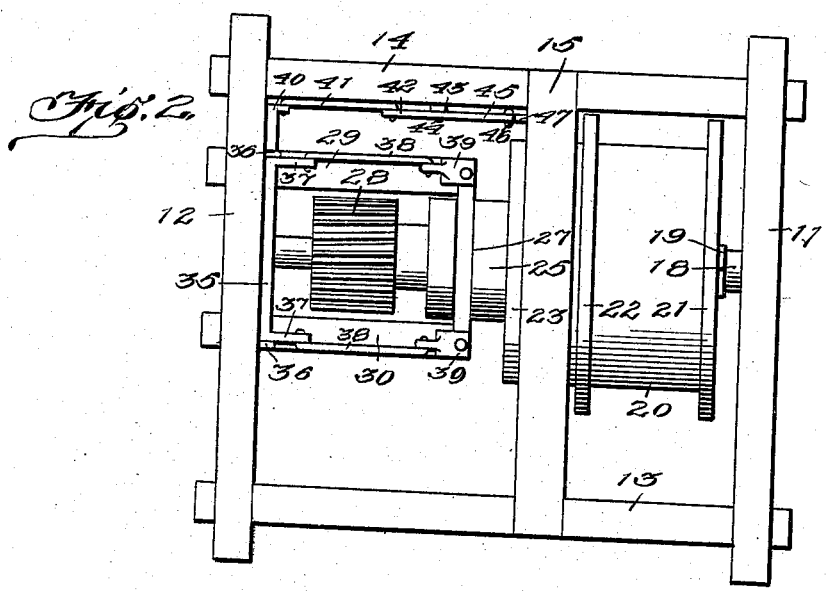

In the drawings forming a portion of this specification and in which like numerals of reference indicate similar parts in the several views, Figure 1 is a front elevational view of the present hoisting machine, Fig. 2 is a rear elevational view showing the worm and its axle removed, Fig. 3 is a horizontal sectional view on the line 3—3 of Fig. 1, Fig. 4 is a vertical sectional view on the line 4—4 of Fig. 1, Fig. 5 is a transverse sectional view on the line 5—5 of Fig. 1 looking the direction of the arrow, Fig. 6 is a vertical transverse sectional view on the line 6—6 of Fig. 1, Fig. 7 is an end elevational view, Fig. 8 is a horizontal sectional view on the line 8—8 of Fig. 1. Fig. 9 is a detail perspective view.

Referring now more particularly to the drawings, there is shown a hoisting machine 10 comprising vertically extending side members 11 and 12 respectively spaced from each other by horizontally disposed members 13 and 14 located adjacent the upper and lower ends of the members 11 and 12. The members 13 and 14 are braced by a vertically disposed beam 15 located at the rear side of the members 13 and 14.

The members 11 and 12 respectively upon their front sides are provided with bearing boxes 16 and 17 respectively, and these bearing boxes are thus arranged to receive a horizontally disposed shaft 18. The shaft 18 adjacent one end is square as shown at 19, and this square portion of the shaft is thus arranged to receive a drum 20 having spaced side flanges 21 and 22. Outwardly of the flange 22, the drum is provided with a circular extension or hub 23. Upon the inner side, the hub or extension 23 is provided with a clutch member 24.

The shaft 18 adjacent the extension 23 of the hub 20 is provided with a slidable sleeve 25, and adjacent the clutch member 24 this sleeve is provided with a clutch member 26. Inwardly of the clutch face the clutch member 26 is grooved circumferentially as shown at 27. Inwardly of the clutch member 26, the sleeve 25 is provided with a spur gear 28 for a purpose to be hereinafter described.

The member 12 is notched as shown at 27' and 28' respectively and these notched portions are disposed above and below the shaft 18 and are thus arranged to receive slidable bars 29 and 30 respectively. The bars 29 and 30 at their inner ends and upon one side are provided with a head 31 and this head is provided with a semicircular rib 32 arranged to partly surround a portion of the groove 27, as shown. The bars 29 and 30 are also arranged to receive a strap 33 having a portion 34 disposed in the groove 27. The strap is located upon the opposite side of the bars from the head 31.

Pivoted to the inner side of the member 12 inwardly of the shaft 18, there is shown a rock arm 35 journaled in bearings 36, as shown. The rock arm is provided with inwardly directed ears 37, and these ears are thus arranged to receive rods 38 which have their inner ends pivoted to brackets 39 carried by the bars 29 and 30 respectively. Outwardly of the bearing 36, the arm 35 is provided with a right angularly extending portion 40, and pivoted at the outer end of this portion there is shown a rod or link 41. The inner end of the rod or link 41 is pivotally connected to an arm 42 of a bell crank lever 43. The lever 43 is pivoted as shown at 44 to the under side of the member 14. The bell crank lever is provided with an arm 45 extending toward the drum, and this arm of the lever is arranged to receive a pivoted link 46. The link 46 is also pivotally connected as shown at 47 to the lower end of a lever 48. The lever 48 is pivotally mounted for vertical movement upon the front side of the member 14 as shown at 49. The inner end of the lever 48 is provided with an enlarged head 50, and this head is thus arranged to receive one end of a brake band 51. The other end of the brake band is secured to the beam 15, as shown. The brake band is thus arranged for engagement upon the portion 23 of the hub.

Rearwardly of the gear 29, there is shown a vertically disposed shaft 52 journaled at its ends in the members 13 and 14 respectively. This shaft is provided with a worm gear 53 arranged to mesh with the gear 28, as shown. The shaft is provided with an outwardly extending lever 54, and this lever is arranged for attachment to draft connections.

From the construction described, it will be seen that a simple and inexpensive machine is provided. When the lever 48 is moved in an upward direction it will be seen that the brake band will frictionally engage the portion 23 of the drum 20, and by the arrangement of clutch operating mechanism connected with this lever the clutch will be thrown out of engagement at the time of engagement of the brake band with the drum. A reverse movement of the lever releases the brake band and throws in the clutch as is obvious.

What is claimed is:

1. In a machine of the class described, the combination with a revoluble drum having a clutch face at one side, a sliding clutch member located adjacent said clutch face for co-engagement therewith, a gear wheel carried by said sliding clutch member, a driving worm in mesh with said gear wheel, a pivotally mounted lever disposed above said drum, a brake band carried by said lever for engagement with a portion of said drum, and connections between said lever and said sliding clutch member respectively.

2. The combination with a revoluble drum having a clutch face at one side and a movable clutch member located adjacent the drum for engagement with said clutch face, of a gear wheel carried by said clutch member, a drive worm in mesh with said gear wheel, a friction brake engaged with a portion of said drum, a pivoted brake operating lever disposed above said drum, and means carried by said lever for movement of said clutch member toward and away from said clutch face.

3. A hoisting mechanism comprising a revoluble drum including a shaft therefor, said drum having a clutch face at one side, a fixed member located rearwardly of said drum, a brake band fixed at one of its ends to said member, a pivoted lever disposed above said drum and engaged with the other end of said brake band, slidable bars located adjacent said clutch face, a clutch member carried by said bars and slidably arranged upon said shaft, a gear wheel carried by said clutch member, a worm gear engaged with said gear wheel, an oscillating member located adjacent said slidable bars, connections between said oscillating member and said bars, and connections between said lever and said oscillating bars respectively.

In testimony whereof I affix my signature, in presence of two witnesses.

JOSHUA J. SAY.

Witnesses:
G. W. UNDERWOOD,
MAY WATSON.